United States Patent
Iu

(10) Patent No.: US 7,649,030 B2
(45) Date of Patent: Jan. 19, 2010

(54) POLYURETHANE WITH FLUORO-DIOLS SUITABLE FOR INK-JET PRINTING

(75) Inventor: Kai-Kong Iu, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 77 days.

(21) Appl. No.: 11/698,492

(22) Filed: Jan. 25, 2007

(65) Prior Publication Data

US 2008/0182028 A1  Jul. 31, 2008

(51) Int. Cl.
*C09D 11/00* (2006.01)
(52) U.S. Cl. .................. 523/160; 523/161; 524/590; 427/466; 106/31.13
(58) Field of Classification Search .............. None
See application file for complete search history.

(56) References Cited

U.S. PATENT DOCUMENTS

| | | | | |
|---|---|---|---|---|
| 6,001,923 | A * | 12/1999 | Moncur et al. | 524/590 |
| 6,136,890 | A * | 10/2000 | Carlson et al. | 523/160 |
| 6,908,185 | B2 * | 6/2005 | Chen et al. | 347/96 |
| 7,022,801 | B2 | 4/2006 | Medsker | |
| 7,087,710 | B2 | 8/2006 | Medsker | |
| 7,354,985 | B2 * | 4/2008 | Malik et al. | 528/70 |
| 7,399,576 | B1 * | 7/2008 | Levanon | 430/302 |
| 2003/0109662 | A1 * | 6/2003 | Medsker et al. | 528/25 |
| 2003/0138650 | A1 | 7/2003 | Fay | |
| 2004/0087680 | A1 | 5/2004 | Hage | |
| 2004/0087759 | A1 * | 5/2004 | Malik et al. | 528/403 |
| 2004/0242804 | A1 | 12/2004 | Medsker et al. | |
| 2005/0147918 | A1 | 7/2005 | Weber | |
| 2005/0227151 | A1 | 10/2005 | Hata et al. | |
| 2005/0266335 | A1 | 12/2005 | Johnson | |
| 2006/0063077 | A1 | 3/2006 | Hata et al. | |
| 2006/0257785 | A1 | 11/2006 | Johnson | |

OTHER PUBLICATIONS http://www.omnova.com/products/chemicals/documents/POLYFOX_FactSheet_07Jan23.pdf.*
http://www.omnova.com/products/chemicals/documents/polyfoxFactSheetFinal_2_06.pdf.*
Focus on Surfactants, issue 4 (2004), p. 3.*
http://findarticles.com/p/articles/mi_hb3143/is_/ai_n28840592.*
Dr. Barry Rosenbaum, New Fluorosurfactants Address Environmental Concerns Surrounding C8 Telomer Chemistries, OMNOVA Solutions Inc., Fairlawn, OH, Apr. 1, 2005.
http://www.omnova.com/products/chemicals/documents/polyfoxFactSheetFinal_2_06.pdf.
Focus on Surfactants, issue4 (2004), p. 3.

* cited by examiner

*Primary Examiner*—David Wu
*Assistant Examiner*—Vu Nguyen

(57) ABSTRACT

The present invention is drawn toward ink-jet inks, coating compositions, methods of printing durable images, and fluoro-diol-modified polyurethanes. The ink-jet ink can comprise a liquid vehicle, a colorant, and a fluoro-diol-modified polyurethane binder having a weight average molecular weight from about 3,000 Mw to about 180,000 Mw, wherein each side chain of the binder has no more than 15 fluoro substitutions.

52 Claims, No Drawings

POLYURETHANE WITH FLUORO-DIOLS SUITABLE FOR INK-JET PRINTING

BACKGROUND OF THE INVENTION

As the ink-jet printing field develops, improvements in printing characteristics such as edge acuity, optical density, substrate adherence, dry time, resolution, durability, water-fastness, etc., continue to be explored. At the same time, while trying to improve upon these characteristics, fluids of the ink-jet system should also provide long term storage stability and long term reliability without significant equipment corrosion or nozzle clogging. Because all of these goals are difficult to achieve, commercial inks for use in ink-jet printers often represent a compromise in an attempt to achieve at least an adequate response in meeting the above listed objectives.

Various substances have been used to formulate ink-jet inks and other recording solutions in an attempt to meet the above objectives and others. Some of these substances that have been included are pigments and/or dyes to provide color to the image, water and/or water-soluble or miscible organic solvents to provide a liquid composition that functions properly within ink-jet equipment, surfactants of various ionic character to provide decreased surface tension at various liquid interfaces, dispersants for enhancing solubility or dispersion characteristics, and various other solution characteristic modifiers such as viscosity modifiers, pH adjustors, antiseptics, antioxidants, chelating agents, biocides, or the like. These additives can be used to achieve certain printing goals such as those related to ink flow, surface tension, scratch resistance, etc. However, some additives, though they may work well in certain ink formulations, can cause bioaccumulation of hazardous materials in fish and mammals, and thus, are not particularly environmentally friendly.

DETAILED DESCRIPTION OF THE PREFERRED EMBODIMENT(S)

In recognition of the current state of the art, it would be desirable to provide new binders, coatings, ink-jet inks, and methods of printing durable images with improved flow and leveling, de-aeration, surface tension reduction, improved scratch resistance, and/or improved environmentally friendliness.

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

The single forms "a," "an," and, "the" include plural referents unless it is clear the context is otherwise. For example, "an ink" includes reference to one or more of such inks.

As used herein, "liquid vehicle" is defined to include liquid compositions that can be used to carry colorants to a substrate. Liquid vehicles are well known in the art, and a wide variety of ink vehicles may be used in accordance with embodiments of the present invention. Such liquid vehicles may include a mixture of a variety of different agents, including without limitation, surfactants, solvents, co-solvents, buffers, biocides, viscosity modifiers, sequestering agents, stabilizing agents, and/or water. The liquid vehicle can also carry other additives such as latex particulates and other polymers, UV curable materials, and/or plasticizers, in some embodiments.

The term "colorant" includes both dyes and pigments.

An "ink" or "ink-jet ink" refers to a solution or dispersion composition that can comprise a liquid vehicle and a colorant. In accordance with embodiments of the present invention, the ink can include as a fluoro-diol-modified polyurethane binder. In another embodiment, an ink-jet ink might not include the fluoro-diol-modified polyurethane binder, but the binder can be formulated in a dispersion or solution that can be applied as an overcoat with respect to a printed ink-jet ink on a media substrate. The colorant can be a dye and/or a pigment. Exemplary pigments include those from pigment dispersions that include a separate dispersing agent, or alternatively, self-dispersed pigments that include attached or closely associated small molecule or polymeric dispersants at the surface of the pigments.

"Self-dispersed pigment" or "self-dispersing pigment" refers to a pigment physically or chemically attached to a dispersant agent, such as a small molecule or polymeric dispersant. A self-dispersed pigment can be adequately dispersed in solution for purposes of ink-jetting and storage stability without the aid of other agents, though such agents can optionally be present in the liquid vehicle.

The term "fluoro-diol-modified polyurethane" refers to binders prepared and/or as described in accordance with embodiments of the present invention. It is noted that polyurethane is typically synthesized from the reaction of isocyanate and polyol. Instead of only using hydrocarbon polyol, environmentally friendly fluoro-diols can be used rather than or along with the hydrocarbon polyols. Exemplary fluoro-diols that can be used include those available under the tradename PolyFox from Omnova, e.g., PF-636, PF-6320, PF-656, PF-6520, etc. These fluoro-diols utilize a shorter fluorinated carbon chain chemistry that does not have the environmental drawback of more conventional C8 (or greater) fluorosurfactant based systems. Fluoro-diol materials typically have a fluoro carbon side chain that is less than 8 carbons in length, but is more typically less than 4 or 5 carbons in length. The generic structure of certain fluoro-diols that can be used in the production of fluoro-diol-modified polyurethane binders in accordance with embodiments of the present invention are shown in Formula 1, as follows:

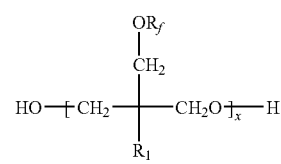

Formula 1

In Formula 1, x can be from 3 to 50, and $R_f$ can be a fluorinated (including partially or fully) alkyl group with a general molecular structure of $-C_nF_YH_Z$, where n is from 1 to 7, Y is from 1 to 15, and Z is from 0 to 15, with the proviso that Y+Z is at least 3. In one embodiment, if $R_f$ is a straight fluorinated alkyl chain, then Y+Z=2n+1. Though not limiting, there will typically be no more than about 15 fluoro substitutions on each $R_f$ group, and often, no more than 7, 5, or even no more than 3 fluoro substitutions in some embodiments. Examples of $R_f$ groups that can be present include $CF_3$, $C_2F_5$, $CH_2CF_3$, or $CH_2CF_2CF_3$. Further, it is noted that $R_1$ can be $-H$, $-CH_3$ or another lower alkyl (e.g., $C_2$-$C_7$), or aryl. The fluoro-diolmodified polyurethane binder can be any fluoro-diol modified polyurethane binder having a weight average molecular weight from about 3,000 Mw to about 180,000 Mw, though they are typically from about 3,000 Mw to about 30,000 Mw, or even from about 5,000 Mw to about 20,000 Mw. The fluoro-diol-modified polyurethane binder can also have an acid value from 20 to 200, and more typically, is from 40 to 180.

As used herein, a plurality of components may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. This same principle applies to ranges reciting only one numerical value. Furthermore, such an interpretation should apply regardless of the breadth of the range or the characteristics being described.

In accordance with this, an ink-jet ink can comprise a liquid vehicle, a colorant, and a fluoro-diol-modified polyurethane binder having a weight average molecular weight from about 3,000 Mw to about 180,000 Mw. In one embodiment, each fluorinated side chain of the binder has no more than 15 fluoro substitutions.

In an alternative embodiment, a coating composition can comprise a liquid vehicle and a fluoro-diol-modified polyurethane having a weight average molecular weight from about 3,000 Mw to about 180,000 Mw. Again, in one embodiment, each fluorinated side chain of the binder has no more than 15 fluoro substitutions.

In another embodiment, a method printing a durable image can comprise jetting an ink-jet ink onto a media substrate to form a printed image. The ink-jet ink can comprise a fluoro-diol-modified polyurethane binder having a weight average molecular weight from about 3,000 Mw to about 180,000 Mw, wherein each fluorinated side chain of the binder has no more than 15 fluoro substitutions. Alternatively or additionally, the printed image can be overcoated with a coating composition comprising a fluoro-diol-modified polyurethane binder having a weight average molecular weight from about 3,000 Mw to about 180,000 Mw, wherein each fluorinated side chain of the binder has no more than 7 fluorine substitutions.

In another embodiment, a fluoro-diol-modified polyurethane prepared using at least one fluoro-diol of Formula 1, where x is from 3 to 50; $R_f$ is a fluorinated alkyl group with a general molecular structure of $-C_nF_YH_Z$, where n is from 1 to 7, Y is from 1 to 15, and Z is from 0 to 15, with the proviso that Y+Z is at least 3; and $R_1$ is $-H$, $-CH_3$, $-C_2-C_7$ lower alkyl, or aryl.

In each of the above embodiments, if present, the colorant can be a dye or a pigment (unmodified, milled, self-dispersed, etc.). The fluoro-diol-modified polyurethane binder can have a weight average molecular weight from about 3,000 Mw to about 180,000 Mw, from about 3,000 Mw to about 30,000 Mw, or from about 5,000 Mw to about 20,000 Mw. Further, the fluoro-diol-modified polyurethane can be prepared using at least one fluoro-diol of Formula 1 above, where x is from 3 to 50; $R_f$ is a fluorinated alkyl group with a general molecular structure of $-C_nF_YH_Z$, where n is from 1 to 7, Y is from 1 to 15, and Z is from 0 to 15, with the proviso that Y+Z is at least 3; and $R_1$ is $-H$, $-CH_3$, $-C_2-C_7$ lower alkyl, or aryl. More specific examples of certain $R_f$ groups from Formula 1 that can be used include fluorinated alkyl groups from $C_1$ to $C_3$, or even more specifically, $CF_3$, $C_2F_5$, $CH_2CF_3$, or $CH_2CF_2CF_3$. Further, x can be any functional number from 3 to 50, 3 to 30, 6 to 20, 6, or 20, for example. The fluoro-diol-modified polyurethane can be prepared by reacting an isocyanate with the at least one fluoro-diol. As mentioned, hydrocarbon polyols can optionally be co-reacted with the isocyanate and the fluoro-diols, or the fluoro-diols can be reacted with the isocyanate alone. When incorporated into an ink-jet ink or coating composition, the surface tension can be formulated to be less than about 25 dyne/cm, though this is not required. Additionally, the polyurethane binder can be present in the ink-jet ink or coating composition at from about 0.1 wt % to about 10 wt %, though more typically from 0.2 wt % to about 4 wt %.

As stated previously, ink-jet inks that can be prepared and used in accordance with embodiments of the present invention can include a liquid vehicle and a colorant, and optionally, a fluoro-diol-modified polyurethane binder. Alternatively, the fluoro-diol-modified polyurethane binder can be jetted as a colorless overcoat to an ink printed on a media substrate. In one of either of these embodiments, the colorant can be a dye or a pigment, such as a cyan, magenta, yellow, black, orange, pink, blue, gray, etc., dye or pigment. Further, the total amount of colorant can be present in the ink-jet ink at from 0.5 wt % to 15 wt %, or any incremental range therein.

This being stated, the fluoro-diol-modified polyurethanes of the present invention are particularly useful with pigment based systems. If a pigment is used, the pigment can be a standard pigment that is dispersed by another chemical additive, or can be a self-dispersed pigment having a chemical group covalently attached or physically attached to the surface thereof. Examples of such physical attachment or chemical tethering can be through hydrophobic-hydrophilic attraction, ionic association, covalent bonding, physical adsorption, or other known attachment mechanism. The pigment can be of any color, and the present invention embodiments are not limited to specific pigments. Further, the pigments can be neutral, cationic, anionic, hydrophilic, and/or hydrophobic, without limitation.

Examples of black pigments that can be used include carbon pigments. The carbon pigment can be almost any commercially available carbon pigment that provides acceptable optical density and print characteristics. Carbon pigments suitable for use in the present invention include, without limitation, carbon black, graphite, vitreous carbon, charcoal, and combinations thereof. Such carbon pigments can be manufactured by a variety of known method such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, without limitation, Cabot pigments such as MONARCH 1400, MONARCH 1300, MONARCH 1100, MONARCH 1000, MON- ARCH 900, MONARCH 880, MONARCH 800, MONARCH 700, CAB-O-JET 200, and CAB-O-JET 300; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont. The above list of pigments includes unmodified pigment particulates, small molecule attached pigment particulates, and polymer-dispersed pigment particulates.

A wide variety of colored pigments can be used with the present invention, therefore the following listing is not intended to be limiting. The following color pigments are available from Cabot Corp.: CABO-JET 250C, CABO-JET 260M, and CABO-JET 270Y. The following color pigments are available from BASF Corp.: PALIOGEN Orange, HELIOGEN Blue L 6901F, HELIOGEN Blue NBD 7010, HELIOGEN Blue K 7090, HELIOGEN Blue L 7101F, PALIOGEN Blue L 6470, HELIOGEN Green K 8683, and HELIOGEN Green L 9140. The following pigments are available from Ciba-Geigy Corp.: CHROMOPHTAL Yellow 3G, CHROMOPHTAL Yellow GR, CHROMOPHTAL Yellow 8G, IGRAZIN Yellow 5GT, IGRALITE Rubine 4BL, MONASTRAL Magenta, MONASTRAL Scarlet, MONASTRAL Violet R, MONASTRAL Red B, and MONASTRAL Violet Maroon B. The following pigments are available from Heubach Group: DALAMAR Yellow YT-858-D and HEUCOPHTHAL Blue G XBT-583D. The following pigments are available from Hoechst Specialty Chemicals: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM Yellow HR, NOVOPERM Yellow FGL, Hansa Brilliant Yellow 1 OGX, Permanent Yellow G3R-01, HOSTAPERM Yellow H4G, HOSTAPERM Yellow H3G, Hostaperme Orange GR, HOSTAPERM Scarlet GO, and Permanent Rubine F6B. The following pigments are available from Mobay Corp.: QUINDO Magenta, INDOFAST Brilliant Scarlet, QUINDO Red R6700, QUINDO Red R6713, and INDOFAST Violet. The following pigments are available from Sun Chemical Corp.: L74-1357 Yellow, L75-1331 Yellow, and L75-2577 Yellow.

Examples of dispersant polymers that can be used include water-soluble polymeric resin(s), as long as the resin(s) function to stabilize and/or disperse the pigment in solution (attached or unattached). A polymeric resin that can be used includes those having a weight average molecular weight in a range of 1,000 Mw to 30,000 Mw, or any incremental range therein. For example, in a more detailed embodiment, the polymer can have a weight average molecular weight in a range from 3,000 Mw to 10,000 Mw. Specifically, the resin can be a polymer, block copolymer, tri-block copolymer, graft copolymer, random copolymer, or the like. Additionally, the polymer can include one or more monomers with characteristics such as hydrophilic, hydrophobic, neutral, cationic, anionic, amphoteric, and combinations thereof. Exemplary monomers that can be used to form such polymers and copolymers include, without limitation, styrene, styrene derivatives, vinylnaphthalene, vinylnaphthalene derivatives, aliphatic alcohol esters, of $\alpha$-, $\beta$-ethylenically unsaturated carboxylic acids, acrylic acid, acrylic acid derivatives, maleic acid, maleic acid derivatives, itaconic acid, itaconic acid derivatives, fumaric acid and fumaric acid derivative, and the like, and combinations thereof.

Examples of suitable anionic dyes include a large number of water-soluble acid and direct dyes. Specific examples of anionic dyes include Direct Yellow 86, Acid Red 249, Direct Blue 199, Direct Black 168, Reactive Black 31, Direct Yellow 157, Reactive Yellow 37, Acid Yellow 23, Reactive Red 180, Acid Red 52, Acid Blue 9, Direct Red 227, Acid Yellow 17, Direct Blue 86, Reactive Red 4, Reactive Red 56, Reactive Red 31, and Direct Yellow 132; Aminyl Brilliant Red F-B (Sumitomo Chemical Co.); the Duasyn line of "salt-free" dyes available from Hoechst; mixtures thereof; and the like. Further examples include Bernacid Red 2BMN, Pontamine Brilliant Bond Blue A, BASF X-34, Pontamine, Food Black 2, Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; Pro-Jet 485 (a copper phthalocyanine); Magenta 377; mixtures thereof, and the like. This list is intended to be merely exemplary, and should not be considered limiting.

The fluoro-diol-modified polyurethane binder can facilitate the adherence of the colorant, particularly when the colorant is a pigment, to a substrate. For example, the fluoro-diol-modified polyurethane can anchor the pigment to the substrate, or enhance the electrostatic attraction and interactions of various components of the ink-jet ink. Additionally, these fluoro-diol-modified polyurethanes can improve flow and leveling of inks or coatings where they are incorporated, promote de-aeration of the inks, reduce surface tension, and/or improve scratch resistance due to the formation of a slippery film. For example, inks or coatings that include these binders can provide reduced foaming and air bubbles in the ink due to lower entrapment of the low surface tension fluoro-diol-modified polyurethane component in the ink or coating formulation. This promotes improved architecture (pen) reliability. Also, because of its low surface tension, such inks or coatings are easy to wet the surface of the printing media to give an image that is at least substantially free of image quality defects, e.g., reduced coalesecence, pin hole, etc. Additionally, the slippery nature of resultant printed images can improve handleability of the prints. Further, the class of fluoro materials used to make these fluoro-diol-modified polyurethanes is environmental friendly in that they have little to no bio-accumulation in animals.

Regarding the liquid vehicles and other additives that can be included in the formulations and methods of present invention, it is understood that the enumerated components are exemplary and do not limit the scope of vehicle components that can be used. For example, in some embodiments of the present invention, it may be favorable for the liquid vehicle to comprise water-soluble organic solvents or other co-solvents, and other additives as part of the liquid medium. The balance of any embodiment formulation can be purified water, or other vehicle component known in the art.

The water-soluble organic solvents and/or co-solvents that can be used in the present invention include, but is not limited to, dimethylformamide, dimethylacetamide, acetone, tetrahydrofuran, dioxane, polyethylene glycol, polypropylene glycol, ethylene glycol, propylene glycol, butylene glycol, 1,2-hexanediol, triethylene glycol, 1,2,6-hexanetriol, thiodiglycol, hexylene glycol, diethylene glycol, ethylene glycol methyl ether, diethylene glycol monomethyl ether, triethylene glycol monomethyl ether, ethanol isopropyl alcohol, n-butyl alcohol, isobutyl alcohol, glycerol, n-methyl-2-pyrrolidone, 1,3-dimethylimidazolidinone, triethanolamine, sulfolane, dimethyl sulfoxide, and the like, as well as other amines, ketones, ethers, polyalkylene glycols, alkylene glycols, lower alkyl ethers of polyhydric alcohols, monohydric alcohols, and combinations thereof.

Additionally, the liquid vehicle can comprise humectants. Humectants can be present to enhance the longevity of solution and solubility characteristics, which can be maintained by retention of moisture within the liquid vehicle. Examples of humectants include, but are not limited to, nitrogen-containing compounds such as urea, thiourea, ethylene urea, alkylurea, alkylthiourea, dialkylurea, dialkylthiourea; sugars such as 1-deoxy-D-galactitol, mannitol, and inositol, and combinations thereof. Dantocol is an example of a specific humectant that can be used.

The liquid vehicle can also comprise solution characteristic modifiers such as viscosity modifiers, pH adjusters, preservatives, various types of surfactant, antioxidants, and evaporation accelerators. Examples of surfactants that can be used include primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; and combinations thereof. Fluorosurfactants can also be used such as those previously known in the art (including those which may or may not contribute to environmental concerns), though the use of PolyFox surfactants can alleviate this concern if they are used.

pH adjustors that can be used comprise base agents such as sodium hydroxide, lithium hydroxide, sodium carbonate, ammonium carbonate ammonia sodium acetate, ammonium acetate, morpholine, monoethanolamine, diethanolamine, triethanolamine, ethylmonoethanolamine, n-butyldiethanolamine, di-n-butylethanolamine, monoisopropanolamine, diisopropanolamine, and triisopropanolamine, and the like as well as combinations thereof. Additionally, pH adjustors can also comprise acidic agents that can be selected from the list of acidic crashing agents.

Consistent with the formulation of this invention, various other additives can be used to optimize the properties of the ink composition for specific applications. Examples of these additives are those added to inhibit the growth of harmful microorganisms. These additives may be biocides, fungicides, and other microbial agents, which are routinely used in liquid vehicle formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid) and the like, may be included to eliminate the deleterious effects of heavy metal impurities.

Additionally, solids (either dissolved in the liquid vehicle or dispersed therein) can also be present in the formulations of the present invention, and can include binders, latex particulates, UV curable materials, plasticizers, pigments (other than the colorant), etc.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

To a 1-liter round bottom 3-neck flask equipped with thermometer, stirrer, water condenser and a vacuum outlet is added 0.2 mole of a fluoro-diol (PF-636 from Omnova MW=1038). Next, 0.8 mole of isophorone diisocyanate (IPDI) is added dropwise into the reaction flask containing the fluoro-diol. The mixture is stirred at 100° C. for approximately 3 hours, and then 0.5 mole of dimethylol propionic acid (DMPA) and 0.2 mole Dowanol TPM are added while continuously stirring and heating at 100° C. for additional 3 hours. The free IPDI can be monitored by infra-red spectroscopy at an absorption peak wave number of about 2240. This viscous intermediate can be diluted with acetone and neutralized with 45% aqueous potassium hydroxide solution to achieve 95% stoichiometric ionization based on dimethylol propionic acid. The acetone can be removed by heating under vacuum to prepare an aqueous dispersion at about 20% solids. It is noted that other solid content percentages can be obtained in accordance with principles of the present examples, e.g., 10%, 30% 50% solids, etc.

Example 2

To a 1-liter round bottom 3-neck flask equipped with thermometer, stirrer, water condenser and a vacuum outlet is added 0.1 mole of a fluoro-diol (PF-636 from Omnova MW=1038) and 0.1 mole of polypropylene glycol (PPG-1K from Aldrich MW=1000). Next, 0.8 mole of isophorone diisocyanate (IPDI) is added dropwise into the reaction flask containing the fluoro-diol and polypropylene glycol. The mixture is stirred at 100° C. for approximately 3 hours, and then 0.5 mole of dimethylol propionic acid (DMPA) and 0.2 mole Dowanol TPM are added while continuously stirring and heating at 100° C. for additional 3 hours. The free IPDI can be monitored by infra-red spectroscopy at an absorption peak wave number of about 2240. This viscous intermediate can be diluted with acetone and neutralized with 45% aqueous potassium hydroxide solution to achieve 95% stoichiometric ionization based on dimethylol propionic acid. The acetone can be removed by heating under vacuum to prepare an aqueous dispersion at 20% solids. It is noted that other solid content percentages can be obtained in accordance with principles of the present examples, e.g., 10%, 30% 50% solids, etc.

Example 3

To a 1-liter round bottom 3-neck flask equipped with thermometer, stirrer, water condenser and a vacuum outlet is added 0.2 mole of polypropylene glycol (PPG-1K from Aldrich MW=1000). Next, 0.8 mole of isophorone diisocyanate (IPDI) is added dropwise into the reaction flask containing the polypropylene glycol. The mixture is stirred at 100° C. for approximately 3 hours, and then 0.5 mole of an acid charge group dimethylol propionic acid (DMPA) and 0.2 mole of an end-capper Dowanol TPM are added while continuously stirring and heating at 100° C. for additional 3 hours. The free IPDI can be monitored by infra-red spectroscopy at an absorption peak wave number of about 2240. This viscous intermediate can be diluted with acetone and neutralized with 45% aqueous potassium hydroxide solution to achieve 95% stoichiometric ionization based on dimethylol propionic acid. The acetone can be removed by heating under vacuum to prepare an aqueous dispersion at 20% solids. It is noted that other solid content percentages can be obtained in accordance with principles of the present examples, e.g., 10%, 30% 50% solids, etc.

Example 4

Example 1 is repeated, except that PF-6320, PF-656, or PF-6520 (each a fluoro-diol from Omnova) is used instead of PF-636.

Example 5

Example 2 is repeated, except that PF-6320, PF-656, or PF-6520 (each a fluoro-diol from Omnova) is used instead of PF-636.

Example 6

Three ink-jet inks are prepared in accordance with Table 1, as follows:

TABLE 1

| Ink component | Function | Weight % |
| --- | --- | --- |
| Black pigment | colorant | 3 |
| 2-Pyrrolidinone | co-solvent | 1.5 |
| Dantocol | humectant | 8 |
| Surfactants | wetting agent | 0.65 |
| [1]Polyurethane | binder | 0.7 |
| Water | | balance |

[1]Fluoro-diol-modified polyurethane of Examples 1 or 2, or polyurethane of Example 3.

Example 7

The three ink-jet inks of Example 6 when compared to a similarly formulated ink without the polyurethane binder exhibit very similar optical density when printed. Thus, the polyurethane additive does not significantly affect the optical density of the printed image. However, when the printed image of each ink is deliberately smeared with 1 pass by a highlighter marker, e.g., "Faber-Castell" highlighter marker with 300 gram downward force, the smear that occurs is much more significant when no polyurethane is present in the ink. This can be verified by testing the optical density of the smear caused by the highlighter outside of the originally printed image. The ink containing polyurethane binder (with or without the fluoro-diols) will have a lower optical density in the smeared portion, i.e. less trailing smear is transferred outside of the printed image by the highlighter. For example, an ink with a polyurethane binder can have an mOD of about 20-25 in the smeared portion, whereas the mOD for the same ink without the binder can have an mOD of about 5-10.

It is noted that the polyurethane of Example 3 is not a fluoro-diol-modified polyurethane. Though more traditional polyurethane binders similarly reduce smear as described in this Example, there are other advantages of using fluoro-diol-modified polyurethanes. For example, by incorporating the fluoro-diols into the polyurethane (as in Examples 1 and 2), the binder can reduce the surface tension of the ink solution and provide performance improvements such as reduced foaming and increased scratch resistance. Thus, in one embodiment, to achieve the surface tension at a range less than 25 dyne/cm, the fluoro-diol-modified polyurethanes of Examples 1, 2, 4, or 5 can be used.

While the present invention has been described with reference to certain preferred embodiments, those skilled in the art will appreciate that various modifications, changes, omissions, and substitutions can be made without departing from the spirit of the invention. It is to be understood that the present invention is not limited to the disclosed embodiments. The invention is intended to cover various modifications and equivalent arrangements included within the spirit and scope of the claims. Therefore, it is intended that the invention be limited only by the scope of the following claims, where the claims are to be given the broadest interpretation so as to encompass all such modifications and equivalent arrangements.

What is claimed is:

1. An ink-jet ink, comprising:
   (a) a liquid vehicle;
   (b) a colorant; and
   (c) a fluoro-diol-modified polyurethane binder having a weight average molecular weight from about 3,000 Mw to about 180,000 Mw, wherein each fluorinated side chain of the binder has no more than 15 fluoro substitutions.

2. The ink-jet ink of claim 1, wherein the colorant is a dye.

3. The ink-jet ink of claim 1, wherein the colorant is a pigment.

4. The ink-jet ink of claim 1, wherein the colorant is a self-dispersed pigment.

5. The ink-jet ink of claim 1, wherein the fluoro-diol-modified polyurethane binder has a weight average molecular weight from about 5,000 Mw to about 20,000 Mw.

6. The ink-jet ink of claim 1, wherein the fluoro-diol-modified polyurethane is prepared using at least one fluoro-diol of the structure:

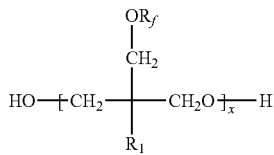

where x is from 3 to 50; $R_f$ is a fluorinated alkyl group with a general molecular structure of —$C_nF_yH_z$, where n is from 1 to 7, Y is from 1 to 15, and Z is from 0 to 15, with the proviso that Y+Z is at least 3; and $R_1$ is —H, —$CH_3$, —$C_2$-$C_7$ lower alkyl, or aryl.

7. The ink-jet ink of claim 6, wherein Y+Z=2n+1.

8. The ink-jet ink of claim 6, wherein $R_f$ is $CF_3$, $C_2F_5$, $CH_2CF_3$, or $CH_2CF_2CF_3$.

9. The ink-jet ink of claim 6, wherein x is 6 or 20.

10. The ink-jet ink of claim 6, wherein $R_f$ is a fluorinated alkyl group from $C_1$ to $C_3$.

11. The ink-jet ink of claim 6, wherein the fluoro-diol-modified polyurethane is prepared by reacting an isocyanate with the at least one fluoro-diol.

12. The ink-jet ink of claim 1, wherein the fluoro-diol-modified polyurethane binder has an acid value from 20 to 200.

13. The ink-jet ink of claim 1, said ink-jet ink having a surface tension less than about 25 dyne/cm.

14. The ink-jet ink of claim 1, wherein each fluorinated side chain of the binder has no more than 7 fluoro substitutions.

15. A coating composition, comprising:
   (a) a liquid vehicle; and
   (b) a fluoro-diol-modified polyurethane binder having a weight average molecular weight from about 3,000 Mw to about 180,000 Mw, wherein each fluorinated side chain of the binder has no more than 15 fluoro substitutions;
   wherein the fluoro-diol-modified polyurethane binder is prepared using at least one fluoro-diol of the structure:

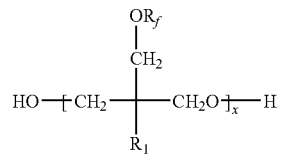

where x is from 3 to 50; $R_f$ is a fluorinated alkyl group with a general molecular structure of —$C_nF_yH_z$, where n is from 1 to 7, Y is from 1 to 15, and Z is from 0 to 15, with the proviso that Y+Z is at least 3; and $R_1$ is —H, —$CH_3$, —$C_2$-$C_7$ lower alkyl, or aryl; and
   wherein the coating composition is ink-jettable.

16. The coating composition of claim 15, wherein the fluoro-diol-modified polyurethane binder has a weight average molecular weight from about 5,000 Mw to about 20,000 Mw.

17. The coating composition of claim 15, wherein Y+Z=2n+1.

18. The coating composition of claim 15, wherein $R_f$ is $CF_3$, $C_2F_5$, $CH_2CF_3$, or $CH_2CF_2CF_3$.

19. The coating composition of claim 15, wherein x is from 6 to 20.

20. The coating composition of claim 17, wherein $R_f$ is a fluorinated alkyl group from $C_1$ to $C_3$.

21. The coating composition of claim 15, wherein the fluoro-diol-modified polyurethane is prepared by reacting an isocyanate with the at least one fluoro-diol.

22. The coating composition of claim 15, formulated to be suitable for jetting from ink-jet architecture to overcoat a printed image.

23. The coating composition of claim 15, wherein the fluoro-diol-modified polyurethane binder has an acid value from 20 to 200.

24. The coating composition of claim 15, said coating composition having a surface tension less than about 25 dyne/cm.

25. The coating composition of claim 15, wherein each fluorinated side chain of the binder has no more than 7 fluoro substitutions.

26. A method printing a durable image, comprising jetting an ink-jet ink onto a media substrate to form a printed image, wherein:
   a) the ink-jet ink comprises a fluoro-diol-modified polyurethane binder having a weight average molecular weight from about 3,000 Mw to about 180,000 Mw, wherein each fluorinated side chain of the binder has no more than 15 fluoro substitutions, or
   b) the printed image is overcoated with a coating composition comprising a fluoro-diol-modified polyurethane binder having a weight average molecular weight from about 3,000 Mw to about 180,000 Mw, wherein each fluorinated side chain of the binder has no more than 15 fluorine substitutions.

27. The method of claim 26, wherein the ink-jet ink comprises the fluoro-diol-modified polyurethane binder.

28. The method of claim 26, wherein the printed image is overcoated with a coating composition comprising a fluoro-diol-modified polyurethane binder.

29. The method of claim 26, wherein both the ink-jet ink comprises the fluoro-diol-modified polyurethane binder, and the printed image is overcoated with a coating composition comprising a fluoro-diol-modified polyurethane binder.

30. The method of claim 26, wherein the fluoro-diol-modified polyurethane binder has a weight average molecular weight from about 5,000 Mw to about 20,000 Mw.

31. The method of claim 26, wherein the fluoro-diol-modified polyurethane is prepared using at least one fluoro-diol of the structure:

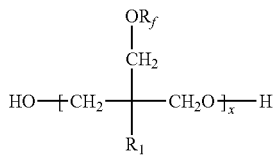

where x is from 3 to 50; $R_f$ is a fluorinated alkyl group with a general molecular structure of $-C_nF_YH_Z$, where n is from 1 to 7, Y is from 1 to 15, and Z is from 0 to 15, with the proviso that Y+Z is at least 3; and $R_1$ is —H, —$CH_3$, —$C_2$-$C_7$ lower alkyl, or aryl.

32. The method of claim 29, wherein Y+Z=2n+1.

33. The method of claim 31, wherein $R_f$ is $CF_3$, $C_2F_5$, $CH_2CF_3$, or $CH_2CF_2CF_3$.

34. The method of claim 31, wherein x is from 6 to 20.

35. The method of claim 31, wherein $R_f$ is a fluorinated alkyl group from $C_1$ to $C_3$.

36. The method of claim 31, wherein the fluoro-diol-modified polyurethane is prepared by reacting an isocyanate with the at least one fluoro-diol.

37. A fluoro-diol-modified polyurethane prepared using at least one fluoro-diol of the structure:

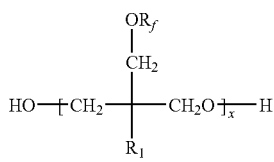

where x is from 3 to 50; $R_f$ is $CF_3$ or $C_2F_5$; and $R_1$ is —H, —$CH_3$, —$C_2$-$C_7$ lower alkyl, or aryl.

38. The fluoro-diol-modified polyurethane of claim 37 having a weight average molecular weight from about 3,000 Mw to about 180,000 Mw.

39. The fluoro-diol-modified polyurethane of claim 37 having a weight average molecular weight from about 3,000 Mw to about 30,000 Mw.

40. The fluoro-diol-modified polyurethane of claim 37, wherein the fluoro-diol-modified polyurethane is prepared by reacting an isocyanate with the fluoro-diol.

41. The fluoro-diol-modified polyurethane of claim 37, wherein the fluoro-diol-modified polyurethane binder has an acid value from 20 to 200.

42. The ink-jet ink of claim 8, wherein $R_f$ is $CF_3$.

43. The ink-jet ink of claim 8, wherein $R_f$ is $C_2F_5$.

44. The coating composition of claim 18, wherein $R_f$ is $CF_3$.

45. The coating composition of claim 18, wherein $R_f$ is $C_2F_5$.

46. The method of claim 33, wherein $R_f$ is $CF_3$.

47. The method of claim 33, wherein $R_f$ is $C_2F_5$.

48. The fluoro-diol-modified polyurethane of claim 37, wherein $R_f$ is $CF_3$.

49. The fluoro-diol-modified polyurethane of claim 37, wherein $R_f$ is $C_2F_5$.

50. The ink-jet ink of claim 1, wherein the ink-jet ink has an increased milli-optical density (mOD) of at least about 10 units as compared to a comparative ink that does not have the fluoro-diol-modified polyurethane binder.

51. The coating composition of claim 15, wherein the coating composition has an increased milli-optical density (mOD) of at least about 10 units as compared to a comparative coating composition that does not have the fluoro-diol-modified polyurethane binder.

52. The method of claim 26, wherein the printed image of the ink-jet ink has an increased milli-optical density (mOD) of at least about 10 units as compared to a comparative printed image from a comparative ink-jet ink that does not have the fluoro-diol-modified polyurethane binder.

* * * * *

UNITED STATES PATENT AND TRADEMARK OFFICE
CERTIFICATE OF CORRECTION

| | | |
|---|---|---|
| PATENT NO. | : 7,649,030 B2 | Page 1 of 1 |
| APPLICATION NO. | : 11/698492 | |
| DATED | : January 19, 2010 | |
| INVENTOR(S) | : Kai-Kong Iu | |

It is certified that error appears in the above-identified patent and that said Letters Patent is hereby corrected as shown below:

In column 12, line 27, in Claim 20, delete "claim 17" and insert -- claim 15 --, therefor.

In column 12, line 44, in Claim 26, after "method" insert -- of --.

Signed and Sealed this

Fifteenth Day of June, 2010

David J. Kappos
*Director of the United States Patent and Trademark Office*